United States Patent
Prakash et al.

(10) Patent No.: US 7,730,277 B1
(45) Date of Patent: Jun. 1, 2010

(54) SYSTEM AND METHOD FOR USING PVBN PLACEHOLDERS IN A FLEXIBLE VOLUME OF A STORAGE SYSTEM

(75) Inventors: Ashish Prakash, Morrisville, NC (US); John K. Edwards, Sunnyvale, CA (US); Sriram Rao, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 578 days.

(21) Appl. No.: 10/972,817

(22) Filed: Oct. 25, 2004

(51) Int. Cl.
- G06F 12/00 (2006.01)
- G06F 13/00 (2006.01)
- G06F 13/28 (2006.01)
- G06F 9/26 (2006.01)
- G06F 9/34 (2006.01)
- G06F 9/455 (2006.01)
- G06F 17/30 (2006.01)

(52) U.S. Cl. ............ 711/170; 711/171; 711/172; 711/173; 711/159; 711/202; 711/203; 718/1; 707/206

(58) Field of Classification Search .......... 711/159, 711/202–203, 170–173; 718/1; 707/206
See application file for complete search history.

(56) References Cited

U.S. PATENT DOCUMENTS

| | | |
|---|---|---|
| 4,156,907 A | 5/1979 | Rawlings et al. |
| 4,399,503 A | 8/1983 | Hawley |
| 4,570,217 A | 2/1986 | Allen et al. |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,989,206 A | 1/1991 | Dunphy, Jr. et al. |
| 5,124,987 A | 6/1992 | Milligan et al. |

(Continued)

FOREIGN PATENT DOCUMENTS

WO     WO 89/10594     11/1989

OTHER PUBLICATIONS

U.S. Appl. No. 10/836,817, filed Apr. 30, 2004, Edwards et al.

(Continued)

*Primary Examiner*—Sanjiv Shah
*Assistant Examiner*—Yaima Campos
(74) *Attorney, Agent, or Firm*—Cesari and McKenna, LLP

(57) ABSTRACT

A multi-stage technique invalidates and replaces loadable physical volume block numbers (pvbns) stored in indirect blocks of a dual vbn ("flexible") virtual volume (vvol) of a storage system to enable efficient image transfers and/or fragmentation handling of the flexible vvol. Each loadable pvbn of a pvbn/virtual vbn (vvbn) block pointer pair is converted into a special block pointer having a predefined reserved value that provides a temporary "pvbn_unknown" placeholder until replaced by a real (actual) pvbn. The technique further allows the storage system to serve data from the flexible vvol using the placeholders while the actual pvbns are computed, thereby eliminating latencies associated with completion of actual pvbn replacement for the pvbn_unknown placeholders.

52 Claims, 9 Drawing Sheets

U.S. PATENT DOCUMENTS

| | | | |
|---|---|---|---|
| RE34,100 | E | 10/1992 | Hartness |
| 5,155,835 | A | 10/1992 | Belsan |
| 5,163,131 | A | 11/1992 | Row et al. |
| 5,202,979 | A | 4/1993 | Hillis et al. |
| 5,278,979 | A | 1/1994 | Foster et al. |
| 5,426,747 | A | 6/1995 | Weinreb et al. |
| 5,581,724 | A | 12/1996 | Belsan et al. |
| 5,819,292 | A | 10/1998 | Hitz et al. |
| 6,061,770 | A | 5/2000 | Franklin |
| 6,081,875 | A | 6/2000 | Clifton et al. |
| 6,205,529 | B1* | 3/2001 | Shagam ..................... 711/170 |
| 6,341,341 | B1 | 1/2002 | Grummon et al. |
| 6,574,591 | B1* | 6/2003 | Kleiman et al. .............. 707/203 |
| 6,604,118 | B2 | 8/2003 | Kleiman et al. |
| 6,636,879 | B1 | 10/2003 | Doucette et al. |
| 7,024,427 | B2* | 4/2006 | Bobbitt et al. .............. 707/200 |
| 7,127,577 | B2 | 10/2006 | Koning et al. |
| 7,243,207 | B1 | 7/2007 | Prakash et al. |
| 7,430,571 | B2 | 9/2008 | Edwards |
| 2001/0044807 | A1 | 11/2001 | Kleinman et al. |
| 2002/0184430 | A1* | 12/2002 | Ukai et al. ..................... 711/3 |
| 2003/0018872 | A1* | 1/2003 | Blackmore et al. .......... 711/202 |
| 2003/0182502 | A1* | 9/2003 | Kleiman et al. ............. 711/114 |
| 2004/0030668 | A1 | 2/2004 | Pawlowski et al. |

OTHER PUBLICATIONS

U.S. Appl. No. 10/951,196, filed Oct. 8, 2004, Fair et al.
Dave Hitz et al., File System for an NFS File Server Appliance [TR 3002], Network Appliance, Inc.
Administration Guide found at http://www.openafs.org/pages/doc/AdminGuide/auagd010.htm visited on Mar. 2, 2005.
Basilico, et al., *Error Correction System Using "Shadow Memory,"* IBM Technical Disclosure Bulletin, May 1984, pp. 5792-5793.
Bitton, Dina, *Disk Shadowing*, Proceedings of the 14$^{th}$ VLDB Conference, LA, CA (1988).
Blasgen, M.W. et al., *System R:An architectural Overview*,Reprinted from IBM Systems Journal vol. 20, No. 1, 1981 © 1981, 1999.
Borenstein, Nathaniel S., *CMU's Andrew project a retrospective*, Communications of ACM, (39)12, Dec. 1996.
Brown, Mark R. et al., *The Alpine file system*, ACM Transactions on Computing Systems, 3(4):261-293, Nov. 1985.
Chen, Peter M., et al., *An Evaluation of Redundant Arrays of Disks Using an Amdahl 5890* Performance Evaluation, pp. 74-85, 1990.
Chutani. Sailesh. et al., *The Episode file system*, In Proceedings of the USENIX Winter 1992.
Clark, B.E., et al., *Application System /400 Performance Characteristics*, IBM Systems Journal, 28(3):407-423, 1989.
Data Sheet for the Check Point Software Technologies product Flood-Gate-1 (1997).
Dibble, Peter C., et al., Beyond Striping: The Bridge Multiprocessor File System, Computer Science Department, University of Rochester, Aug. 11, 1989.
Douglis, Fred, et al., *A comparison of two distributed systems: Amoeba and Sprite*— Computing Systems, 4(4), Fall 1991, pp. 353-385 ?{copy of article I have has no date or cite}.
Gait, Jason, *Phoenix: A Safe In-Memory File System*. Communications of the ACM, 33(1):81-86, Jan. 1990.
Hartman, John H. et al., *Performance Measurements of a Multiprocessor Sprite Kernel*, Proceedings of the USENIX Conference, 1990.
Hitz, Dave et al., *File System Design for an NFS File Server Appliance*, Technical Report 3002, Rev. C395, presented Jan. 19, 1994.
Howard, John H, et al. *Scale and Performance in a Distributed File System*, Carnegie Mellon University, CMU-ITC-87-068, Aug. 5, 1987.
Howard, John, H. et al., *Scale and performance in a distributed file system*, ACM Trans. Computer. System., 6(1), Feb. 1988 pp. 51-81.
Howard, John H., *An Overview of the Andrew File System*, Carnegie Mellon University, CMU-ITC-88-062.
*The IBM System/38*, Chapter 8, pp. 137-15.
Isomaki, Markus, *Differentiated Service for the Internet*, Department of Technical Physics and Mathematics, May 9, 1998.
Kazar, Michael L., et al., *Decorum File System Architectural Overview*, USENIX Summer Conference, Anaheim, California, 1990.
Lomet, David., et al., *The performance of a multiversion access method*, ACM SIGMOD International Conference on Management of Data, 19:353-363.
Lorie, Raymond, A, *Physical integrity in a large segmented database*, ACM Trans. Database Systems, (2)1: 91-104, Mar. 1977.
Lorie, RA, *Shadow Page Mechanism*, IBM Technical Disclosure Bulletin, Jun. 1986, pp. 340-342.
McKusick, Marshall Kirk, et al., *A Fast File System for UNIX*, Computer Science Division, Department of Electrical Engineering and Computer Sciences, Univ. of CA, Berkley, Feb. 18, 1994.
Miller, Ethan L., et al., *RAMA:A File System for Massively Parallel Computers*, 12$^{th}$ IEEE Symposium on Mass Storage Systems, Monterey CA, Apr. 1993, pp. 163-168.
Moons, Herman et al., *Location-Independent Object Invocation in Open Distributed Systems*, Autumn 1991 EurOpen Technical Conference and Exhibition, pp. 287-300 (Sep. 16-20, 1991).
Morris, James H., et al, *Andrew: A Distributed Personal Computing Environment*, Comm. of the ACM, vol. 29, Mar. 1986, pp. 184-201.
Mullender, Sape J., et al., *A distributed file service based on optimistic concurrency control*, ACM Symposium on Operating System Principles (Orcas Island, Washington). Published as Operating Systems Review, 19(5):51-62, Dec. 1985.
Muller, Keith, et al., *A High Performance Multi-Structured File System Design*, In Proceedings of the 13th ACM Symposium on Operating Systems Principles, Oct. 1991, pp. 56-67.
Ousterhout, John K. et al., *The Sprite Network Operating System*, Computer Science Division, Department of Electrical Engineering and Computer Sciences, Univ. of CA, Berkley, Nov. 19, 1987.
Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.
Ousterhout, John, *Why Aren't Operating Systems Getting Faster as Fast as Hardware?*, Digital WRL Technical Note TN-11, Oct. 1989.
Ousterhut, John, *A Brief Retrospective On The Sprite Network Operating System*, found in http://www.cs.berkeley.edu/projects/sprite/retrospective.html.visited on Mar. 11, 2005.
Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).
Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).
Peterson, Zachary Nathaniel Joseph, *Data Placement for Copy-on-Write Using Virtual Contiguity*, University of CA, Santa Cruz, Master of Science in Computer Science Thesis, Sep. 2002.
Quinlan, Sean, *A Cached WORM File System*, Software-Practice and Experience, 21(12):1289-1299 (1991).
Redundant Array of Independent Disks, from Wikipedia, the free encyclopedia, found at http://en.wikipedia.org/wiki/RAID, visited on Mar. 9, 2005.
Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.
Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.
Rosenblum, Mendel, et al, The *Design and Implementation of a Log-Structured File System* Jul. 24, 1991 pp. 1-15.
Rosenblum, Mendel, et al., *The Design and Implementation of a Log-Structured File System,*, In Proceedings of ACM Transactions on Computer Systems, (10)1:26-52, Feb. 1992.
Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al, *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

Finlayson, Ross S., Et Al., Log Files: An Extended File Service Exploiting Write-Once Storage Department of Computer Science, Stanford University, Report No. STAN-CS-87-1177, Sep. 1987.

Hecht, Matthew S., Et Al. Shadowed Management of Free Disk Pages with a Linked List, ACM Transactions on Database Systems, 8/4, Dec. 1983, pp. 503-514.

Kazar, Michael Leon, Synchronization and Caching Issues in the Andrew File System, Carnegie Mellon University, CMU-ITC-88-063.

Kent, Jack Et Al., Optimizing Shadow Recovery Algorithms, IEEE Transactions on Software Engineering, 14( 2): 155-168 , Feb. 1988.

Rosenblum, Mendel, The Design and Implementation of a Log-Structured File System, 1992 pp. 1-93.

\* cited by examiner

SYSTEM AND METHOD FOR USING PVBN PLACEHOLDERS IN A FLEXIBLE VOLUME OF A STORAGE SYSTEM

CROSS REFERENCES TO RELATED APPLICATIONS

The present invention is related to the following commonly assigned U.S. patent application Ser. No. 10/950,893 titled, Technique for Translating a Pure Virtual File System Data Stream into a Hybrid Virtual Volume and Ser. No. 10/951,196 titled, Technique for Translating a Hybrid Virtual Volume File System into a Pure Virtual File System Data Stream, filed on Oct. 8, 2004.

FIELD OF THE INVENTION

The present invention relates to storage systems and, more specifically, to the use of block pointer placeholders in a flexible volume of a storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system. The file system typically consists of a contiguous range of vbns from zero to n, for a file system of size n−1 blocks.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

The write-anywhere file system (such as the WAFL file system) has the capability to generate a snapshot of its active file system. An "active file system" is a file system to which data can be both written and read, or, more generally, an active store that responds to both read and write I/O operations. It should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. In the case of the WAFL file system, a PCPI is always an active file system image that contains complete information about the file system, including all metadata. A PCPI can also include other information (metadata) about the active file system at the particular point in time for which the image is taken. The terms "PCPI" and "snapshot" may be used interchangeably through out this patent without derogation of Network Appliance's trademark rights.

The write-anywhere file system supports multiple snapshots that are generally created on a regular schedule. Each snapshot refers to a copy of the file system that diverges from the active file system over time as the active file system is modified. In the case of the WAFL file system, the active file system diverges from the snapshots since the snapshots stay in place as the active file system is written to new disk locations. Each snapshot is a restorable version of the storage element (e.g., the active file system) created at a predetermined point in time and, as noted, is "read-only" accessible and "space-conservative." Space conservative denotes that common parts of the storage element in multiple snapshots share the same file system blocks. Only the differences among these various snapshots require extra storage blocks. The multiple snapshots of a storage element are not independent copies, each consuming disk space; therefore, creation of a snapshot on the file system is instantaneous, since no entity data needs to be copied. Read-only accessibility denotes that a snapshot cannot be modified because it is closely coupled to a single writable image in the active file system. The closely coupled association between a file in the active file system and the same file in a snapshot obviates the use of multiple "same" files. In the example of a WAFL file system, snapshots are described in *TR3002 File System Design for a NFS File Server Appliance* by David Hitz et al., published by Network Appliance, Inc. and in U.S. Pat. No. 5,819,292 entitled Method for Maintaining Consistent States of a File System and For Creating User-Accessible Read-Only Copies of a File System, by David Hitz et al., each of which is hereby incorporated by reference as though full set forth herein.

U.S. patent application Ser. No. 10/836,817 titled Extension of Write Anywhere File System Layout, by John K. Edwards et al. and assigned to Network Appliance, Inc., describes a file system layout that apportions an underlying physical volume into one or more virtual volumes (vvols) of a storage system. The underlying physical volume is an aggregate comprising one or more groups of disks, such as RAID groups, of the storage system. The aggregate is apportioned into one or more virtual volumes (vvols) of the storage system. The aggregate has its own physical volume block number (pvbn) space and maintains metadata, such as block allocation structures, within that pvbn space. Each vvol has its own virtual volume block number (vvbn) space and maintains metadata, such as block allocation structures, within that vvbn space. Each vvol is a file system that is associated with a container file; the container file is a file in the aggregate that contains all blocks used by the vvol. Moreover, each vvol comprises data blocks and indirect blocks that contain block pointers that point at either other indirect blocks or data blocks. In a hybrid vvol design, these block pointers are pvbns in the aggregate that hosts the vvol, whereas in a dual vbn hybrid vvol design, the block pointers are both pvbns and vvbns. Notably, pvbns reference locations on disks of the aggregate, while vvbns reference locations within files of the vvol.

Transferring such hybrid vvols between source and destination aggregates either on the same storage system or across a network poses the problem of "interpreting" these block pointers on the source and destination, and transforming them into a format that allows the destination to recreate the same vvol in terms of data and snapshots as it existed at the source. Such format transformation means that the appropriate (indirect) block pointers on both the source and destination of an image transfer provide access to exactly the same data blocks. If a dual vbn hybrid ("flexible") vvol is transferred by simply moving blocks and putting them in place on the destination, data integrity will be violated since the mapping between pvbns on the source and destination is not the same.

Specifically, when performing an image transfer the pvbn indirect block pointers on the source, which reference locations on disks attached to the source, have no meaning on the destination and, in particular, to locations on disks coupled to the destination. The is image transfer may be performed in accordance with a volume replication facility and typically comprises a file system data stream that is provided by the source to a destination via image transfer operations, such as volume copying and synchronous or asynchronous mirroring. The image transfer operations typically operate on the granularity of a vvol and transfer all the blocks of a source vvol to a destination vvol on an aggregate of the destination. The pvbn block pointers in the indirect blocks (or inodes) on the source vvol may not exist on the destination (or may not be available on the destination) for many reasons such as, e.g., when going from a larger aggregate on the source to a smaller aggregate on the destination. Thus, a technique is needed to invalidate the source pvbn block pointers in the indirect blocks prior to converting those invalidated pointers into pvbn block pointers that "make sense" on the destination.

SUMMARY OF THE INVENTION

The present invention is directed to a multi-stage technique for invalidating and replacing loadable physical volume block numbers (pvbns) stored in indirect blocks of a dual vbn ("flexible") virtual volume (vvol) of a storage system to enable efficient image transfers and/or fragmentation handling of the flexible vvol. As defined herein, a "loadable" pvbn is a pvbn having a value greater than zero. According to the technique, each loadable pvbn of a pvbn/virtual vbn (vvbn) block pointer pair is converted into a special block pointer having a predefined reserved value that provides a temporary "pvbn_unknown" placeholder until replaced by a real (actual) pvbn. The technique further allows the storage system to serve data from the flexible vvol using the placeholders while the actual pvbns are computed, thereby eliminating latencies associated with completion of actual pvbn replacement for the pvbn_unknown placeholders.

A first stage of the novel technique substitutes the pvbn_unknown placeholders for the loadable pvbns of the pvbn/vvbn pointer pairs using block type and level bits to determine the type of each block and the locations of block pointers within each type of block retrieved from disk. A second stage of the technique then employs a "deswizzle" scanner to replace the pvbn_unknown placeholders with actual pvbns. In addition, the is deswizzle scanner prepares the blocks having the replaced pvbns for write allocation to thereby provide actual pvbns for those blocks. In the event a data access request is received at the storage system for a block yet to undergo pvbn invalidation and replacement, the vvbn of the block is used to access a container map to resolve the pvbn needed to retrieve the block from disk. Notably, at the time the block is retrieved from disk, its on-disk structure is not changed to the resolved pvbn; all changes to the on-disk structures of blocks are performed by the deswizzle scanner.

Advantageously, the invention may be utilized for both synchronous and asynchronous flexible vvol mirror image transfers on a same aggregate and/or between aggregates on a storage system or among different storage systems, as well as for copying and fragmentation handling of flexible vvols. By enabling a flexible vvol to serve data immediately upon pvbn invalidation, the present invention improves performance of the storage system by eliminating latencies associated with waiting for completion of actual pvbn replacement for the pvbn_unknown placeholders before rendering the system capable of serving data.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
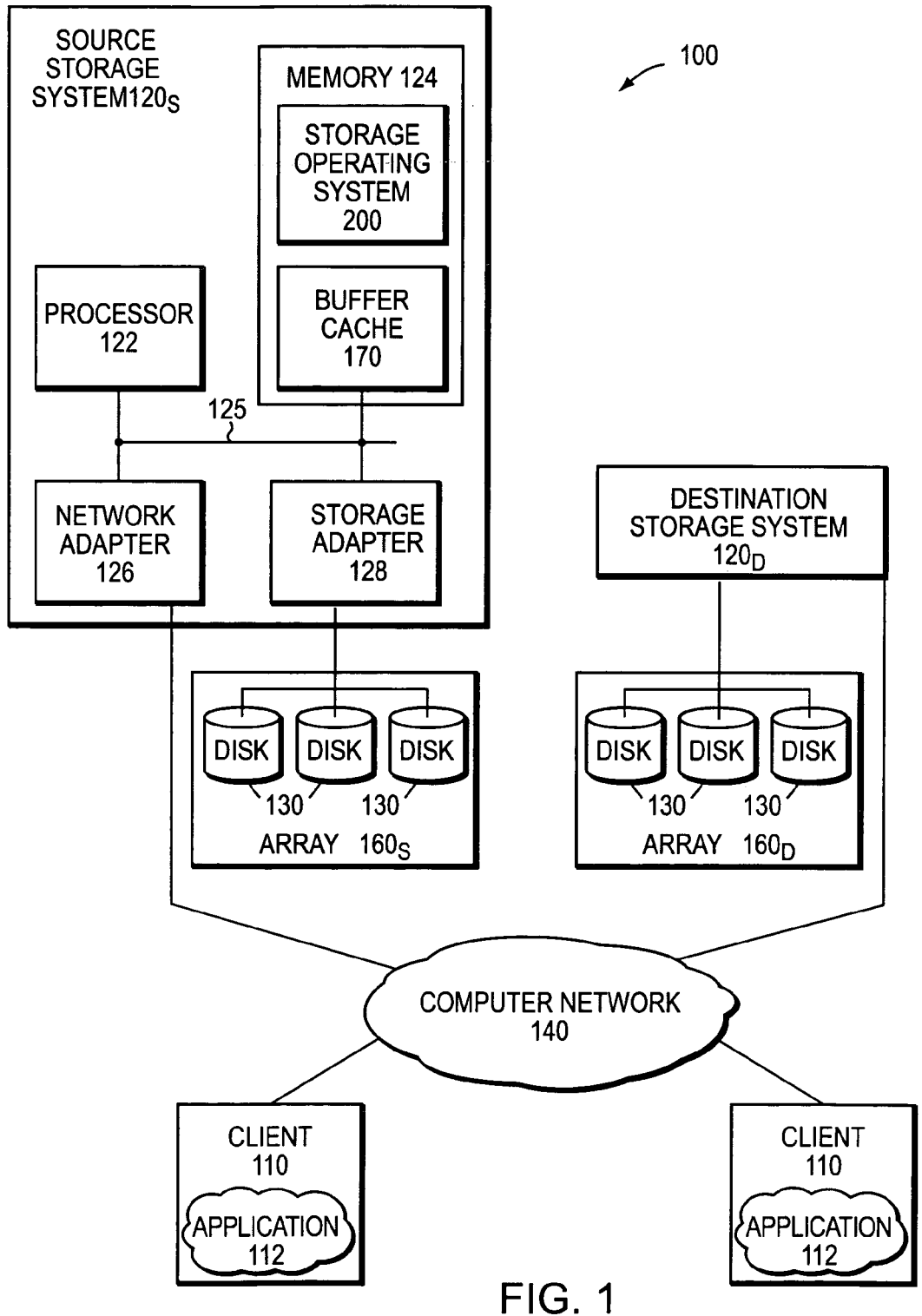
FIG. 1 is a schematic block diagram of a computer network including a plurality of storage systems that may be advantageously used with the present invention.

FIG. 1 is a schematic block diagram of a network environment 100 including a plurality of storage systems 120, such as source storage system $120_S$ and destination storage system $120_D$, that may be advantageously used with the present invention. Each storage system is a computer that provides storage service relating to the organization of information on storage devices, such as disks 130 of a disk array $160_{S,D}$. Each storage system $120_{S,D}$ comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and special types of files called virtual disks (hereinafter "blocks") on the disks.

In the illustrative embodiment, the memory 124 comprises storage locations that are addressable by the processor and adapters for storing software program code. A portion of the memory may be further organized as a "buffer cache" 170 for storing data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the invention described herein.

The network adapter 126 comprises the mechanical, electrical and signaling circuitry needed to connect the storage system 120 to one of a plurality of clients 110 over a computer network 140, which may comprise a point-to-point connection or a shared medium, such as a local area network. Illustratively, the computer network 140 may be embodied as an Ethernet network or a Fibre Channel (FC) network. Each client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array $160_{S,D}$. The storage adapter includes input/output (I/O) interface circuitry that couples to the disks over an I/O interconnect arrangement, such as a conventional high-performance, FC serial link topology.

Storage of information on each array $160_{S,D}$ is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 2:
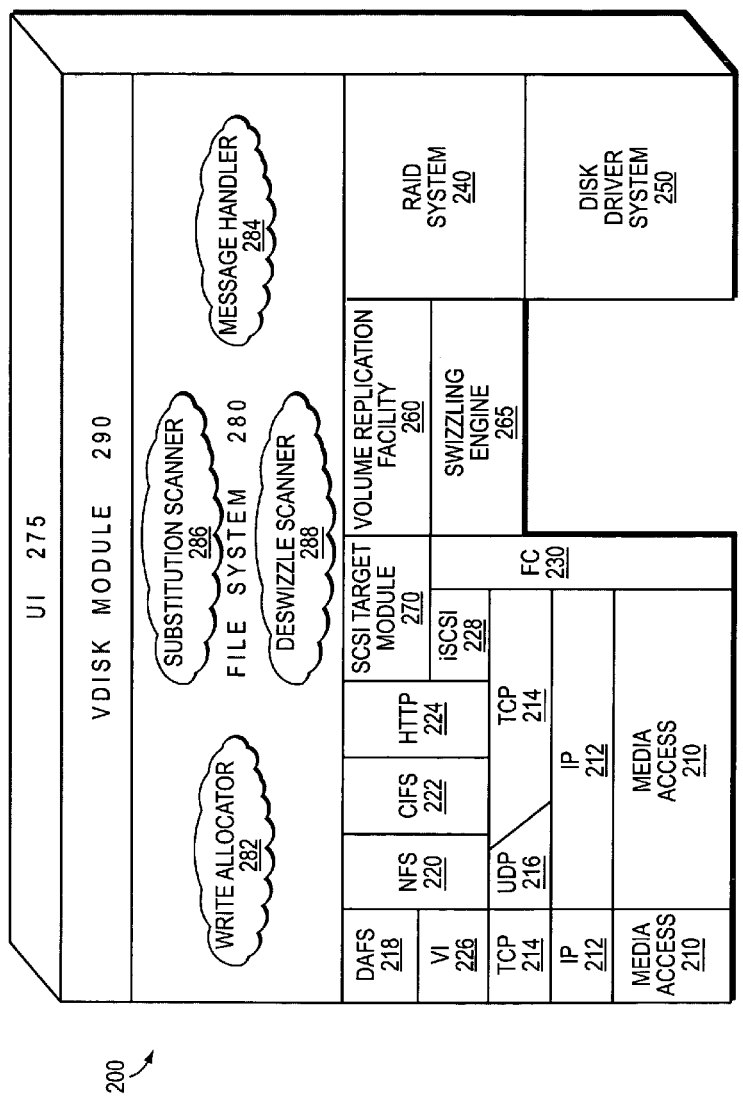
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a high-level module, such as file system 280, interacting with virtualization modules illustratively embodied as, e.g., vdisk module 290 and SCSI target module 270. The vdisk module 290 is layered on the file system 280 to enable access by administrative interfaces, such as a user interface (UI) is 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 110 is forwarded as a packet over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in core", i.e., in the buffer cache 170. If the information is not in the cache, the file system 280 indexes into the inode file using the inode number to access an appropriate entry and retrieve a logical vbn. The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 110 over the network 140.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 120. An example of a multi-protocol storage appliance that may be advantageously used with the present invention is described in U.S. patent application Ser. No. 10/215,917 titled, Multi-Protocol Storage Appliance that provides Integrated Support for File and Block Access Protocols, filed on Aug. 9, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
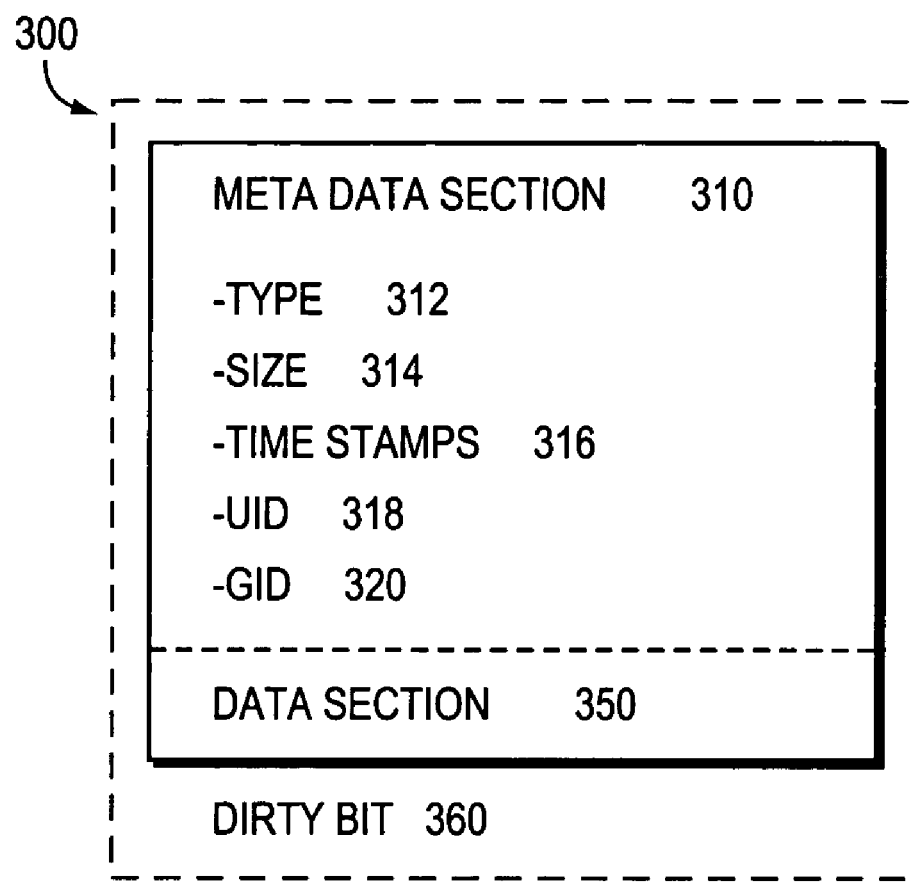
FIG. 3 is a schematic block diagram of an inode that may be advantageously used with the present invention.

In the illustrative embodiment, a file is represented in the write-anywhere file system as an inode data structure adapted for storage on the disks 130. FIG. 3 is a schematic block diagram of an inode 300, which preferably includes a metadata section 310 and a data section 350. The information stored in the metadata section 310 of each inode 300 describes the file and, as such, includes the type (e.g., regular, directory, virtual disk) 312 of file, the size 314 of the file, time stamps (e.g., access and/or modification) 316 for the file and ownership, i.e., user identifier (UID 318) and group ID (GID 320), of the file. The contents of the data section 350 of each inode, however, may be interpreted differently depending upon the type of file (inode) defined within the type field 312. For example, the data section 350 of a directory inode contains metadata controlled by the file system, whereas the data section of a regular inode contains file system data. In this latter case, the data section 350 includes a representation of the data associated with the file.

Specifically, the data section 350 of a regular on-disk inode may include file system data or pointers, the latter referencing 4 kB data blocks on disk used to store the file system data. Each pointer is preferably a logical vbn to facilitate efficiency among the file system and the RAID system 240 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 kB, then the data section of the inode (e.g., a first level inode) comprises up to 16 pointers, each of which references a 4 kB block of data on the disk.

Moreover, if the size of the data is greater than 64 kB but less than or equal to 64 megabytes (MB), then each pointer in the data section 650 of the inode (e.g., a second level inode) references an indirect block (e.g., a first level L1 block) that contains 1024 pointers, each of which references a 4 kB data block on disk. For file system data having a size greater than 64 MB, each pointer in the data section 350 of the inode (e.g., a third level L3 inode) references a double-indirect block (e.g., a second level L2 block) that contains 1024 pointers, each referencing an indirect (e.g., a first level L1) block. The indirect block, in turn, that contains 1024 pointers, each of which references a 4 kB data block on disk. When accessing a file, each block of the file may be loaded from disk 130 into the buffer cache 170.

When an on-disk inode (or block) is loaded from disk 130 into buffer cache 170, its corresponding in core structure embeds the on-disk structure. For example, the dotted line surrounding the inode 300 indicates the in core representation of the on-disk inode structure. The in core structure is a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data is marked "dirty" using the dirty bit 360 so that the inode (block) can be subsequently "flushed" (stored) to disk. The in core and on-disk format structures of the WAFL file system, including the inodes and inode file, are disclosed and described in the previously incorporated U.S. Pat. No. 5,819,292 titled Method for Maintaining Consistent States of a File System and for Creating User-Accessible Read-Only Copies of a File System by David Hitz et al., issued on Oct. 6, 1998.

Figure 4:
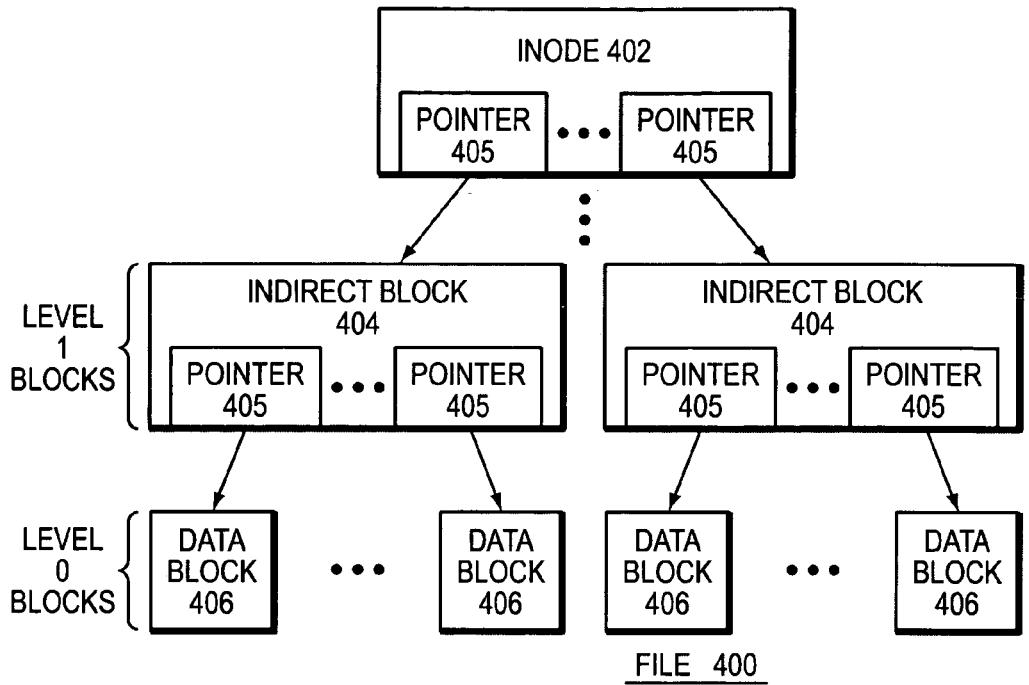
FIG. 4 is a schematic block diagram of an embodiment of a buffer tree of a file.

FIG. 4 is a schematic block diagram of an embodiment of a buffer tree of a file. The buffer tree is an internal representation of blocks for a file (e.g., file 400) loaded into the buffer cache 170 and maintained by the write-anywhere file system 280. A root (top-level) inode 402, such as an embedded inode, references indirect (e.g., level 1) blocks 404. Note that there may be additional levels of indirect blocks (e.g., level 2, level 3) depending upon the size of the file. The indirect blocks (and inode) contain pointers 405 that ultimately reference data blocks 406 used to store the actual data of the file. That is, the data of file 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on the disks 130.

A file system layout is provided that apportions an underlying physical volume into one or more virtual volumes (vvols) of a storage system. An example of such a file system layout is described in U.S. patent application Ser. No. 10/836,817 titled Extension of Write Anywhere File System Layout, by John K. Edwards et al. and assigned to Network Appliance, Inc., which application is hereby incorporated by reference. The underlying physical volume is an aggregate comprising one or more groups of disks, such as RAID groups, of the storage system. The aggregate has its own physical volume block number (pvbn) space and maintains metadata, such as block allocation structures, within that pvbn space. Each vvol has its own virtual volume block number (vvbn) space and maintains metadata, such as block allocation structures, within that vvbn space. Each vvol is a file system that is associated with a container file; the container file is a file in the aggregate that contains all blocks used by the vvol. Moreover, each vvol comprises data blocks and indirect blocks that contain block pointers that point at either other indirect blocks or data blocks.

Figure 5:
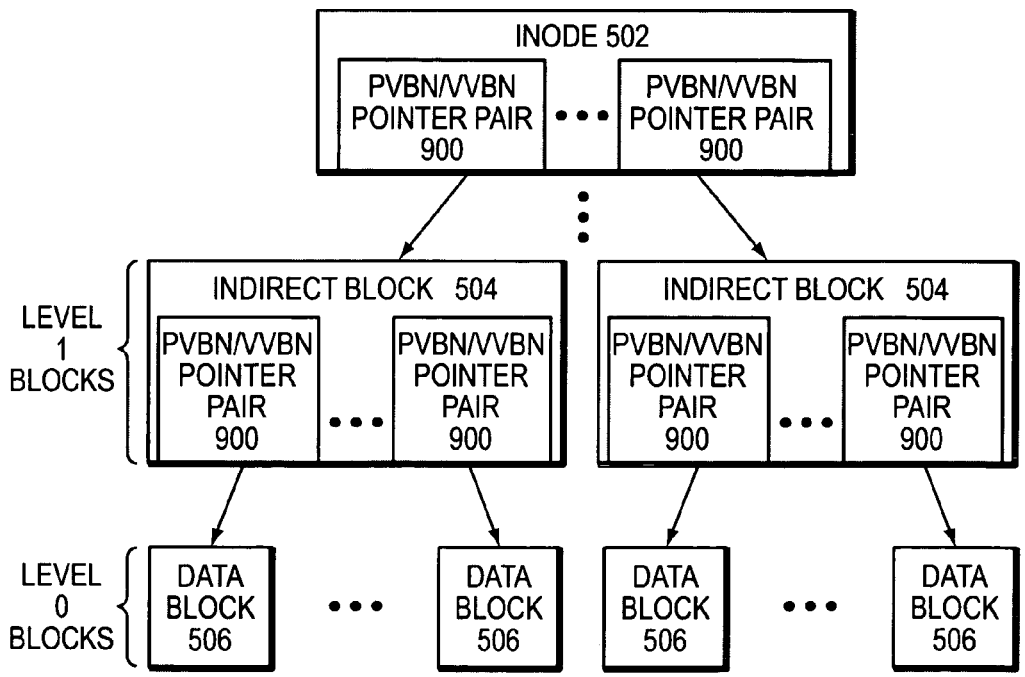
FIG. 5 is a schematic block diagram of an illustrative embodiment of a buffer tree of a file that may be advantageously used with the present invention.

In an illustrative "dual vbn" hybrid ("flexible") vvol embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 5 is a schematic block diagram of an illustrative embodiment of a buffer tree of a file 500 that may be advantageously used with the present invention. A root (top-level) inode 502, such as an embedded inode, references indirect (e.g., level 1) blocks 504. Note that there may be additional levels of indirect blocks (e.g., level 2, level 3) depending upon the size of the file. The indirect blocks (and inode) contain pvbn/vvbn pointer pair structures 900 that ultimately reference data blocks 506 used to store the actual data of the file.

The pvbns reference locations on disks of the aggregate, whereas the vvbns reference locations within files of the vvol. The use of pvbns as block pointers 900 in the indirect blocks 504 provides efficiencies in the read paths, while the use of vvbn block pointers provide efficient access to required metadata. That is, when freeing a block of a file, the parent indirect block in the file contains readily available vvbn block pointers, which avoids the latency associated with accessing an owner map (not shown) to perform pvbn-to-vvbn translations; yet, on the read path, the pvbn is available. However, the dual vbn variant may increase the size of indirection data (metadata) stored in each file.

As noted, each inode has 64 bytes in its data section that, depending upon the size of the inode file (e.g., greater than 64 bytes of data), function as block pointers to other blocks. For traditional and hybrid volumes, those 64 bytes are embodied as 16 block pointers, i.e., sixteen (16) 4 byte block pointers. For the illustrative dual vbn flexible volume, the 64 bytes of an inode are embodied as eight (8) pairs of 4 byte block pointers, wherein each pair is a vvbn/pvbn pair. Moreover, each indirect block of a traditional or hybrid volume may contain up to 1024 (pvbn) pointers; each indirect block of a dual vbn flexible volume, however, has a maximum of 510 (pvbn/vvbn) pairs of pointers.

Note that a volume (vol) info "super" block data structure of a dual vbn flexible volume contains only vvbn pointers, each of which references a fsinfo block for every snapshot and the active file system of the volume (e.g., 255 snapshots and 1 active file system). The volinfo block comprises reserved blocks 1 and 2 (e.g., vvbn 1 and 2) that are identical copies of the volinfo block. Thus, each copy of the volinfo block contains an array of up to 256 vvbn block pointers that reference fsinfo blocks for each snapshot and the active file system. All other blocks that have pointers to other blocks in the dual vbn flexible volume (including the fsinfo blocks) have "dual vbn" (vvbn/pvbn) pairs of pointers. For example, each dual vbn pointer pair of a disk inode references a next level indirect block for the inode file (depending upon the size of the inode file) until eventually the pointer pair references level zero (L0) blocks of the inode file. Each L0 inode file block contains twenty-one (21) actual inodes, each of which is the root of an inode buffer tree and, to that end, points to its own indirect blocks. After traversing the buffer tree, each vvbn/pvbn pointer pair eventually references an actual data block of the file.

Figure 6:
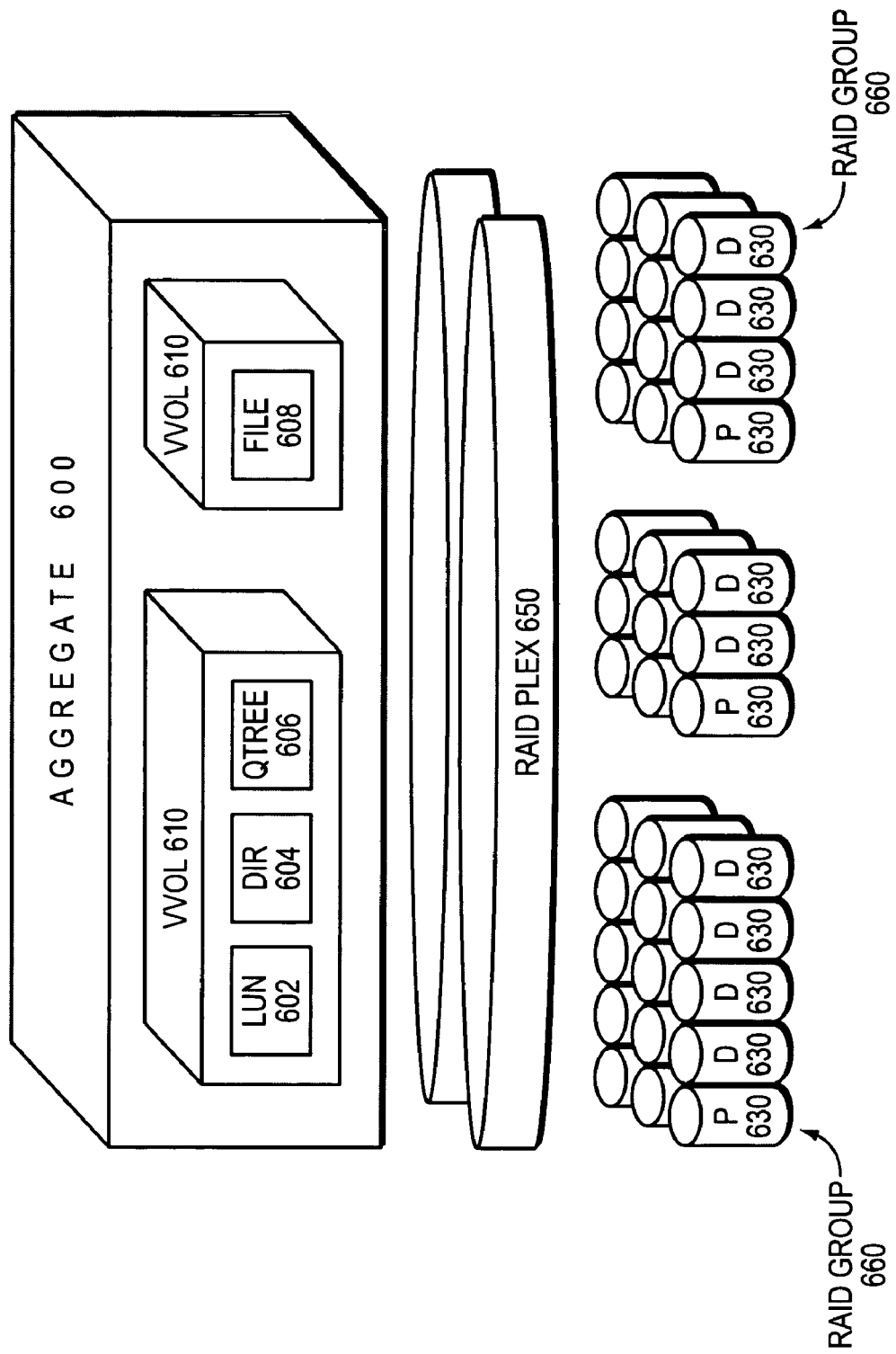
FIG. 6 is a schematic block diagram of an embodiment of an aggregate that may be advantageously used with the present invention.

FIG. 6 is a schematic block diagram of an embodiment of an aggregate 600 that may be advantageously used with the present invention. Luns (blocks) 602, directories 604, qtrees 606 and files 608 may be contained within vvols 610, such as dual vbn flexible vvols, that, in turn, are contained within the aggregate 600. The aggregate 600 is illustratively layered on top of the RAID system, which is represented by at least one RAID plex 650 (depending upon whether the storage configuration is mirrored), wherein each plex 650 comprises at least one RAID group 660. Each RAID group further comprises a plurality of disks 630, e.g., one or more data (D) disks and at least one (P) parity disk.

Whereas the aggregate 600 is analogous to a physical volume of a conventional storage system, a vvol is analogous to a file within that physical volume. That is, the aggregate 600 may include one or more files, wherein each file contains a vvol 610 and wherein the sum of the storage space consumed by the vvols is physically smaller than (or equal to) the size of the overall physical volume. The aggregate utilizes a "physical" pvbn space that defines a storage space of blocks provided by the disks of the physical volume, while each embedded vvol (within a file) utilizes a "logical" vvbn space to organize those blocks, e.g., as files. Each vvbn space is an independent set of numbers that corresponds to locations within the file, which locations are then translated to dbns on disks. Since the vvol 610 is also a logical volume, it has its own block allocation structures (e.g., active, space and summary maps) in its vvbn space.

Figure 7:
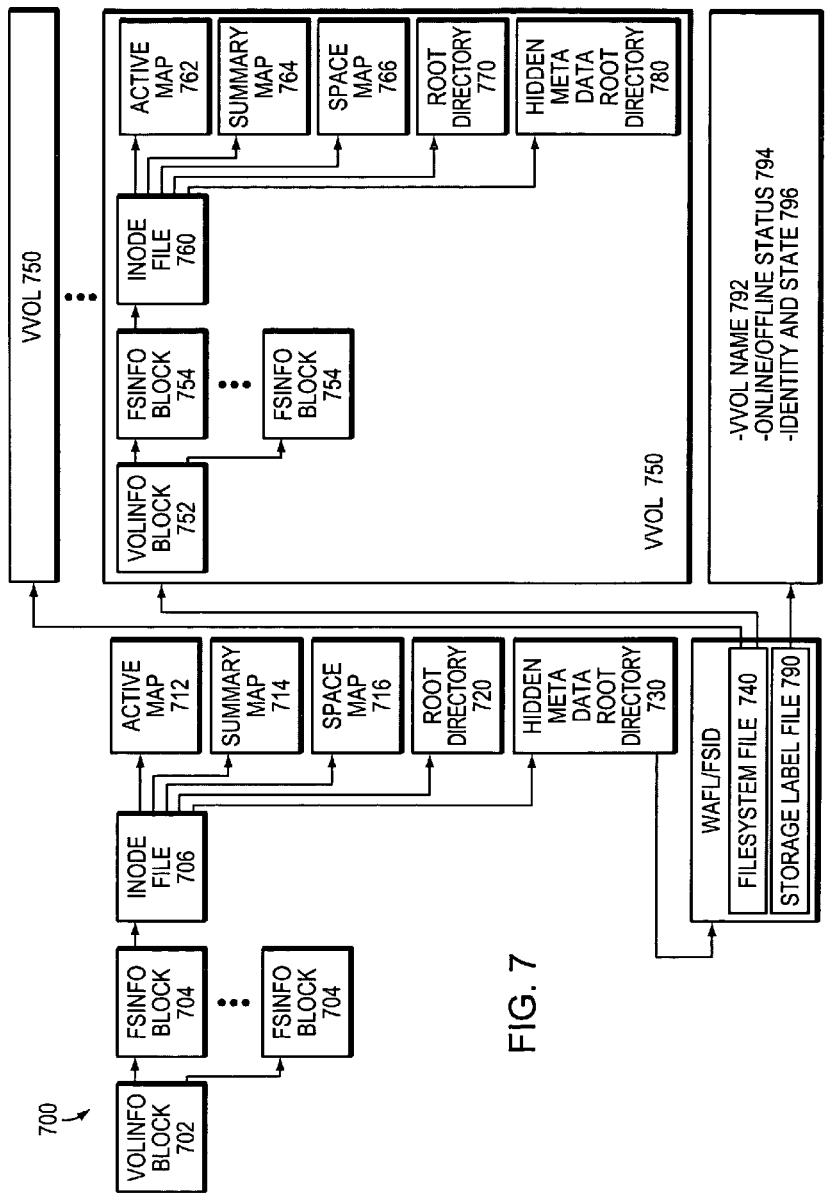
FIG. 7 is a schematic block diagram of an on-disk representation of an aggregate.

FIG. 7 is a schematic block diagram of an on-disk representation of an aggregate 700. The storage operating system 200, e.g., the RAID system 240, assembles a physical volume of pvbns to create the aggregate 700, with pvbns 1 and 2 comprising a "physical" volinfo block 702 for the aggregate. The volinfo block 702 contains block pointers to fsinfo blocks 704, each of which may represent a snapshot of the aggregate. Each fsinfo block 704 includes a block pointer to an inode file 706 that contains inodes of a plurality of files, including an active map 712, a summary map 714 and a space map 716, as well as other special metadata files. The inode file 706 further includes a root directory 720 and a "hidden" metadata root directory 730, the latter of which includes a namespace having files related to a vvol in which users cannot "see" the files. The hidden metadata root directory also includes a WAFL/fsid/directory structure, as described herein, which contains a filesystem file 740 and storage label file 790. Note that root directory 720 in the aggregate is empty; all files related to the aggregate are organized within the hidden metadata root directory 730.

The filesystem file 740 includes block pointers that reference various file systems embodied as vvols 750. The aggregate 700 maintains these vvols 750 at special reserved inode numbers. Each vvol 750 also has special reserved inode numbers within its vvol space that are used for, among other things, the block allocation bitmap structures. As noted, the block allocation bitmap structures, e.g., active map 762, summary map 764 and space map 766, are located in each vvol.

Specifically, each vvol 750 has the same inode file structure/content as the aggregate, with the exception that there is no WAFL/fsid/filesystem file, storage label file directory structure in a hidden metadata root directory 780. To that end, each vvol 750 has a volinfo block 752 that points to one or more fsinfo blocks 754, each of which may represent a snapshot of the vvol. Each fsinfo block, in turn, points to an inode file 760 that, as noted, has the same inode structure/content as the aggregate with the exceptions noted above. Each vvol 750 has its own inode file 760 and distinct inode space with corresponding inode numbers, as well as its own root (fsid) directory 770 and subdirectories of is files that can be exported separately from other vvols.

The storage label file 790 contained within the hidden metadata root directory 730 of the aggregate is a small file that functions as an analog to a conventional raid label. A raid label includes "physical" information about the storage system, such as the volume name; that information is loaded into the storage label file 790. Illustratively, the storage label file 790 includes the name 792 of the associated vvol 750, the online/offline status 794 of the vvol, and other identity and state information 796 of the associated vvol (whether it is in the process of being created or destroyed).

A container file is a file in the aggregate that contains all blocks used by a vvol. The container file is an internal (to the aggregate) feature that supports a vvol; illustratively, there is one container file per vvol. The container file is a hidden file (not accessible to a user) in the aggregate that holds every block in use by the vvol. As noted, the aggregate includes an illustrative hidden metadata root directory that contains subdirectories of vvols:

WAFL/fsid/filesystem file, storage label file

Figure 8:
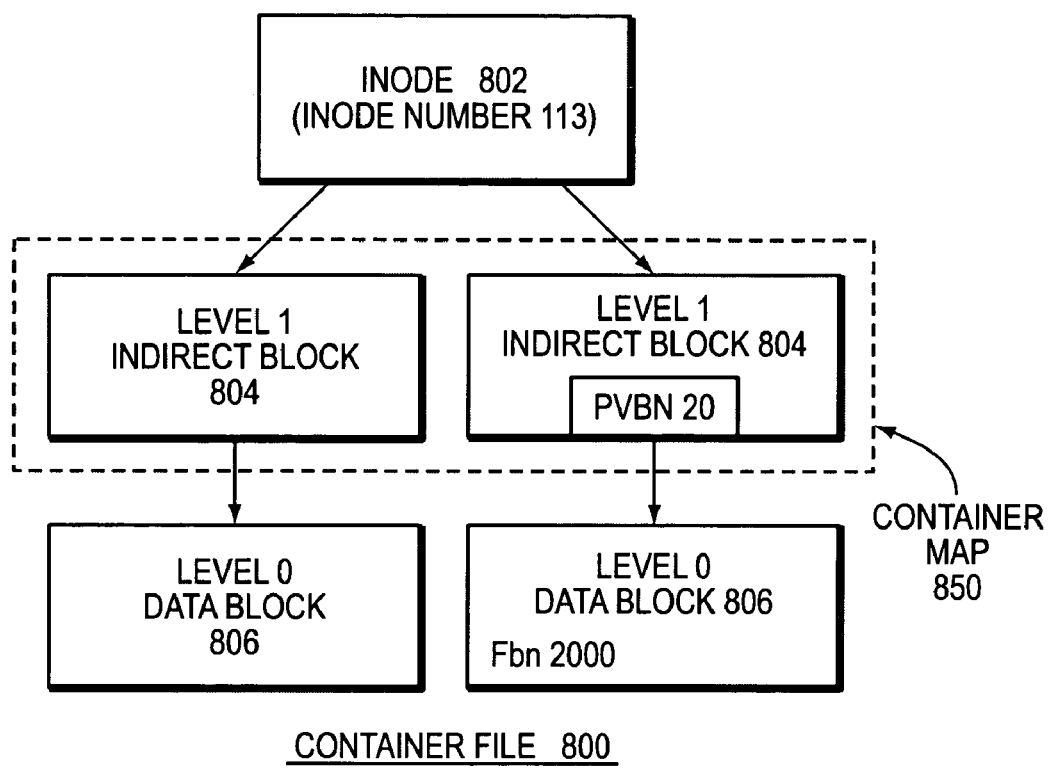
FIG. 8 is a schematic block diagram of a container file that may be advantageously used with the present invention.

Specifically, a "physical" file system (WAFL) directory includes a subdirectory for each vvol in the aggregate, with the name of subdirectory being a file system identifier (fsid) of the vvol. Each fsid subdirectory (vvol) has at least two files, the filesystem file 740 and the storage label file 790. The filesystem file is a large sparse file that contains all blocks owned by a vvol and, as such, is referred to as the container file for the vvol. FIG. 8 is a schematic block diagram of a container file 800 (buffer tree) that is assigned a new type and has an inode 802 that is assigned an inode number equal to a virtual volume id (vvid) of the vvol, e.g., container file 800 has an inode number 113. The container file is essentially one large virtual disk and, since it contains all blocks owned by its vvol, a block with vvbn X in the vvol can be found at fbn X in the container file. For example, vvbn 2000 in a vvol can be found at fbn 2000 in its container file 800. Since each vvol has its own distinct vvbn space, another container file may have fbn 2000 that is different from fbn 2000 in the illustrative container file 800.

Assume that a level 0 block 806 of the container file 800 has an fbn 2000 and an is indirect (level 1) block 804 has a block pointer referencing the level 0 block 806, wherein the block pointer has a pvbn 20. Thus, location fbn 2000 of the container file 800 is pvbn 20 (on disk). Notably, the block numbers are maintained at the first indirect level (level 1) of the container file 800; e.g., to locate block 2000 in the container file, the file system layer accesses the 2000$^{th}$ entry at level 1 of the container file and that indirect block provides the pvbn 20 for fbn 2000.

In other words, level 1 indirect blocks of the container file contain the pvbns for blocks in the file and, thus, "map" vvbns-to-pvbns of the aggregate. Accordingly, the level 1 indirect blocks of the container file 800 are configured as a "container map" 850 for the vvol; there is preferably one container map 850 per vvol. The container map provides block pointers from fbn locations within the container file to pvbn locations on disk. Furthermore, there is a one-to-one correspondence between fbn locations in the container file and vvbn locations in a vvol.

The present invention is directed to a multi-stage technique for invalidating and replacing loadable pvbns stored in indirect blocks of a dual vbn flexible vvol of a storage system to enable efficient image transfers and/or fragmentation handling of the flexible wol. As defined herein, a loadable pvbn is illustratively a pvbn having a value greater than zero. According to the technique, each loadable pvbn of a pvbn/vvbn block pointer pair is converted into a special block pointer having a predefined reserved value that provides a temporary "pvbn_unknown" placeholder until replaced by a real (actual) pvbn. The technique further allows the storage system to serve data from the flexible wol using the placeholders while the actual pvbns are computed, thereby eliminating latencies associated with completion of actual pvbn replacement for the pvbn_unknown placeholders.

Figure 9:
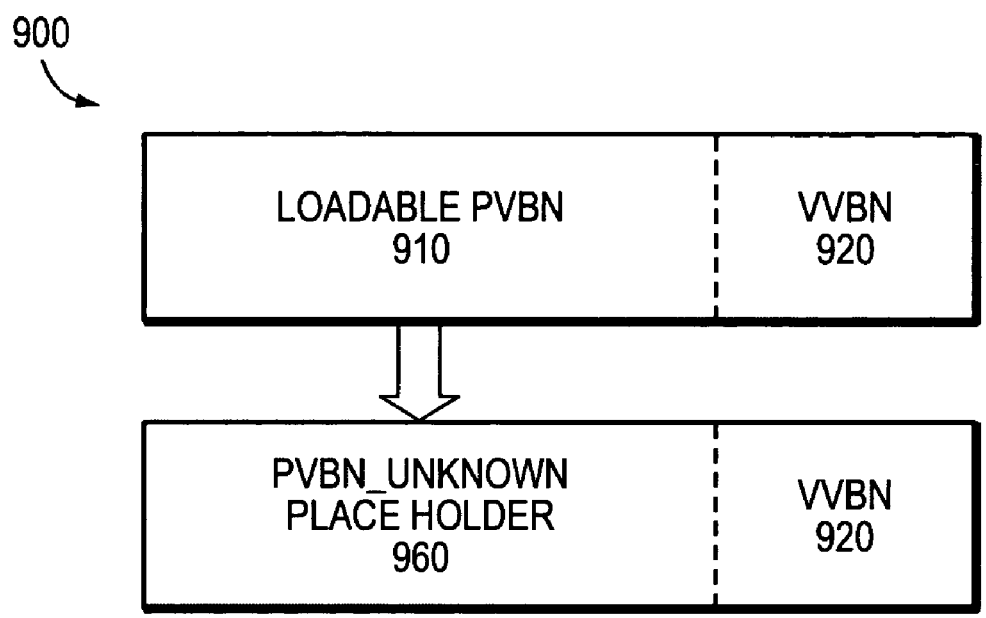
FIG. 9 is a schematic block diagram illustrating a pvbn/vvbn block pointer pair that may be advantageously used with the present invention.

FIG. 9 is a schematic block diagram illustrating a pvbn/vvbn block pointer pair 900 that may be advantageously used with the present invention. As noted, each loadable pvbn 910 of the pvbn/vvbn block pointer pair 900 is converted into a pvbn_unknown placeholder structure 960 in accordance with the present invention. Illustratively, the predefined value of the pvbn_unknown placeholder 960 is minus five (−5), although it will be understood to those skilled in the art that other values may be used that uniquely indicate to the storage operating system that the actual pvbn is "unknown." Moreover, only loadable pvbns 910 are converted into temporary pvbn_unknown placeholders; i.e., pvbn values of zero or less are not converted. In other words, if a pvbn has another reserved value (e.g., 0 indicating a hole) then it is not changed.

A first stage of the novel technique substitutes the pvbn_unknown placeholders for the loadable pvbns of the pvbn/vvbn pointer pairs using block type and level bits. The block type and level bits are used to determine the type of each block (e.g., indirect block, inode file block, level 0 block, etc.) and the locations of block pointers within each type of block retrieved from disk. For example, if the block type is a level 0 block of a regular file, its contents have no block pointers. However, if the block type is an indirect block for a regular file, all of its contents are block pointers and, thus, all 510 loadable pvbns are changed to −5 values. On the other hand, if the block type bits indicate that block is an inode file block, its contents may be block pointers. That is, if the bits indicate that the block is a level 0 block for an inode file having a size greater than 64 bytes, the eight (8) pvbns (of the 8 pvbn/vvbn pairs) are changed to −5 values. Block type and level bits that may be advantageously used with the present invention are described in U.S. patent application Ser. No. 10/950.893 titled, Technique for Translating a Pure Virtual File System Data Stream into a Hybrid Virtual Volume, which application is hereby incorporated by reference.

As noted, the multi-stage pvbn invalidation and replacement technique enables efficient image transfers and/or fragmentation handling of flexible vvols. In the illustrative embodiment, the Data ONTAP operating system leverages the WAFL snapshot capability to provide an automated volume replication (duplication) facility 260 called the SnapMirror facility. SnapMirror technology allows mirroring of an image (e.g., a data set) between the source and destination. As used herein, a data set is defined as one or more storage units, such as dual vbn flexible vvols, that when combined represent data being served, migrated and/or protected. In this sense, the duplicated data set could include all or part of a file system. In addition, the source is a physical storage system that is serving a client's data set and the destination is the same or different physical storage system functioning as a "target" of a data set being served from the source. The destination may also serve its own independent data set. Examples of techniques for duplicating all or part of a volume (file system) are described in U.S. patent application Ser. Nos. 09/127,497 titled File System Image Transfer, by Kleiman et al, filed Jul. 31, 1998 and 09/426,409 titled File System Image Transfer Between Dissimilar File Systems, by Kleiman et al., filed Oct. 25, 1999, which are hereby incorporated by reference.

The volume replication facility (which may include volume copying, asynchronous or synchronous mirroring) is a module that performs computations to determine what blocks should be transferred to the destination. Broadly stated, when instructed to retrieve a vvol, the volume replication facility 260 cooperates with the file system to load a set of volume blocks from disk into memory, based on snapshot and other information provided by the file system 280. The volume replication facility examines each block (vbn) of the container file to determine whether the block is needed for the image transfer. If not, the next block (vbn) is retrieved.

In the illustrative embodiment, a container file on the source represents the image (vvol) to be transferred. The container file stores blocks (0-N) in a vbn space of the file system. Note that the container file may be representative of snapshot or a clone vvol; if a clone, the data blocks may reside in a parent vvol of the clone, recursively. Thus, when serializing the clone vvol, a determination is made as to whether each block to be transferred exists in the clone container file. If it does not, then the volume replication facility examines the container file of the parent vvol to determine whether the block exists therein. If the parent vvol is also a clone, this procedure repeats until the appropriate vbn for the actual data block is found.

In a level 0 block image transfer, all appropriate blocks from the source container file are transferred as a data stream to the destination. On the destination, the transferred blocks are written directly into the vvbn space that is the container file for the vvol on the destination. On the other hand, a level 1 block image transfer is essentially an incremental transfer wherein only those blocks that have changed are sent to the destination. In accordance with such an image transfer, the volume replication facility 260 may examine snapmaps (i.e., snapshotted copies of the active maps) to determine which blocks are in use in snapshots on the source. That is, the facility may examine differences between the snapmaps to determine which blocks are new and formulate a data stream of these blocks for transfer to the destination.

For volume copying or asynchronous mirroring, substitution of pvbn_unknown placeholders 960 for the loadable pvbns 910 is illustratively performed on the source by a swizzling engine module 265 in cooperation with the file system 280. The swizzling engine 265 uses the block type and level bits to determine the type of processing needed for a particular block. For asynchronous mirror image transfers, such substitution is performed for only those blocks that are sent to the destination. The substituted pvbn_unknown placeholders are then transferred within the data stream to the destination. As a performance optimization for synchronous mirroring, however, the pvbn_unknown placeholder substitution is performed on the destination by the volume replication facility 260 as it receives the incoming image transfer stream. Yet despite the type of image transfer, before the data is written to disk and used at the destination, the pvbn_unknown placeholders 960 must be inserted into the respective loadable pvbn block pointer fields 910.

For synchronous mirroring, the image transfer stream includes the appropriate block type and level bits. The volume replication facility 260 cooperates with a message handler process 284 of the file system 280 on the destination to translate the loadable pvbns to pvbn_unknown placeholders after receiving the blocks from the source and before writing them to a destination flexible vvol. This optimization is directed to avoiding a copy operation on the source. In particular, the facility 260 makes a call to the message handler 284 to load each block (with the inserted pvbn_unknown values) into the container file 800 for the destination flexible vvol. To that end, the handler 284 uses the block type and level bits for each vvbn 920 of each block to determine where to insert the pvbn_unknown placeholder (−5) value.

In the case of fragmentation handling of a flexible vvol, all loadable pvbn pointers 910 of indirect blocks that have pointers to data blocks on the vvol are also explicitly marked with pvbn_unknown placeholders 960. That is, pvbn_unknown placeholder values need only be inserted into level 1 (L1) indirect blocks, since all that is required for defragmentation is that the data blocks be sequentially arranged. Marking of pvbn_unknown placeholders/values in the pvbn pointers is illustratively performed by a "substitution" scanner process 286 of the file system 280, preferably on a per volume basis. However, it will be apparent to those skilled in the art that such marking can be performed on a per file basis. In the former volume-based case, the scanner 286 starts at the volinfo block and follows pointers through the fsinfo blocks and inode file buffer trees to the actual buffer trees for the files in the volume. From there (and for each file-based case), the scanner starts at the top-level inode of the buffer tree for a file and "walks down" the tree to all of the level 1 indirect blocks, where substitution of pvbn_unknown values for loadable pvbns is performed.

A second stage of the novel technique employs a "deswizzle" scanner process 288 of the file system 280 that replaces the pvbn_unknown placeholders with actual pvbns. In addition, the deswizzle scanner 288 prepares the blocks having the replaced pvbns for write allocation to thereby provide actual pvbns for those blocks. To that end, the deswizzle scanner 288 accesses an appropriate L1 indirect block (corresponding to the vvbn of the vvbn/pvbn pair) of the container file to map a vvbn 920 of a pvbn/vvbn pair 900 to its corresponding pvbn and then replaces the pvbn_unknown placeholder 960 of the block with that mapped (actual) pvbn. Replacement of all pvbn_unknown placeholders of the block with actual pvbns entails modification of the indirect block which, in turn, requires write allocation of that block, i.e., the block must be written to disk. Thus, as part of the replacement (modification) process, the dirty bit for the block is set and the block is write allocated. Write allocation provides an actual pvbn for that modified block, i.e., the block is assigned a new, actual pvbn that is used by any blocks pointing at the write allocated block.

An example of a write allocation policy that may be advantageously used with the present invention is described in U.S. patent application Ser. No. 10/836,090 titled, Extension of Write Anywhere File Layout Write Allocation, by John K. Edwards and assigned to Network Appliance, Inc. Broadly stated, block allocation proceeds in parallel on the flexible vvol and aggregate when write allocating a block within the vvol, with a write allocator process 282 selecting an actual pvbn in the aggregate and a vvbn in the vvol. The write allocator adjusts block allocation bitmap structures, such an active map and space map, of the aggregate to record the selected pvbn and adjusts similar structures of the vvol to record the selected vvbn. The selected pvbn is also inserted into container map 850 of the destination vvol. Finally, an indirect block or inode file parent of the allocated block is updated with one or more block pointers to the allocated block. The content of the update operation depends on the vvol embodiment. For a dual vbn hybrid vvol embodiment, both the pvbn and vvbn are inserted in the indirect block or inode as block pointers.

In the illustrative embodiment, the deswizzle scanner 288 starts from the "bottom" of inode trees (e.g., L1 indirect blocks) of regular files and proceeds "up" the trees (e.g., L2, L3, etc. blocks) of those files to the inode file (e.g., L0 blocks, L1 and higher indirect blocks) before eventually reaching the fsinfo block. That is, the deswizzle scanner starts by inserting actual (mapped) pvbns into all regular file level 1 indirect blocks using the container file's indirect blocks and then invokes the write allocator 282 to write allocate the modified blocks so that all of the level 1 blocks are assigned actual pvbns. Thereafter, the scanner 288 moves to the level 2 indirect blocks of the regular files that are pointed at by the write allocated level 1 blocks and the above procedure repeats.

Moreover, the deswizzle scanner 288 starts with the oldest snapshot and moves forward in time, "deswizzling" blocks bottom-to-top. For example, the scanner starts operating on all L1 blocks for all inode trees of the oldest snapshot, i.e., it walks through a first inode tree to a last inode tree in that particular snapshot, inserting actual pvbns for pvbn_unknown placeholders in all L1 indirect blocks of the trees. The scanner then initiates write allocation so that all L1 blocks have actual pvbns. Thereafter, the deswizzle scanner inserts actual pvbns for pvbn_unknown placeholders of all L2 blocks for the inode trees and initiates (invokes) write allocation so that all L2 indirect blocks of the inode trees have actual pvbns. Insertion of actual pvbns into pvbn_unknown placeholders 960 and initiation of write allocation continues until the fsinfo block is deswizzled. Note that the scanner 288 proceeds from the oldest snapshot to newer snapshot (or active file system) because blocks in the newer snapshots that are common among the older snapshots will have been previously deswizzled and their pvbn portions will not have to be "replaced" (since they already have actual pvbns).

A further optimization of the present invention is realized by performance of a buffer tree "top-to-bottom" scan by the deswizzle scanner. Here, if the deswizzle scanner 288 finds at any stage (level) of a buffer tree that a particular indirect block or inode block has no pvbn_unknown placeholders, then no blocks "below" that level in the tree will have pvbn_unknown placeholders. This is known as the "pvbn invariant." Since the scanner 288 deswizzles blocks from L1 to L2 (and higher), if at any point in time a block of a level (e.g., a L3 block) is examined/accessed that does not have a pvbn_unknown placeholder 960, then no blocks below that level (e.g., L2, L1 blocks) can have pvbn_unknown placeholders.

Operationally, the deswizzle scanner starts with an inode and moves down to the level of a block that it is currently deswizzling. If, at any level, an inode or indirect block is accessed that does not have a pvbn_unknown placeholder value (−5), then the deswizzle scanner 288 skips the entire (or sub portion of the) buffer tree because of the pvbn invariant. As a result, less work is performed by the deswizzle scanner as it moves "forward in time." However, the scanner 288 must ensure that all blocks of a level (e.g., L1 blocks marked dirty after changing their pointers from pvbn_unknowns to actual pvbns) are assigned (write allocated) actual pvbns before the next level blocks (e.g. L2 blocks) are changed to point at the L1 blocks.

Figure 10:
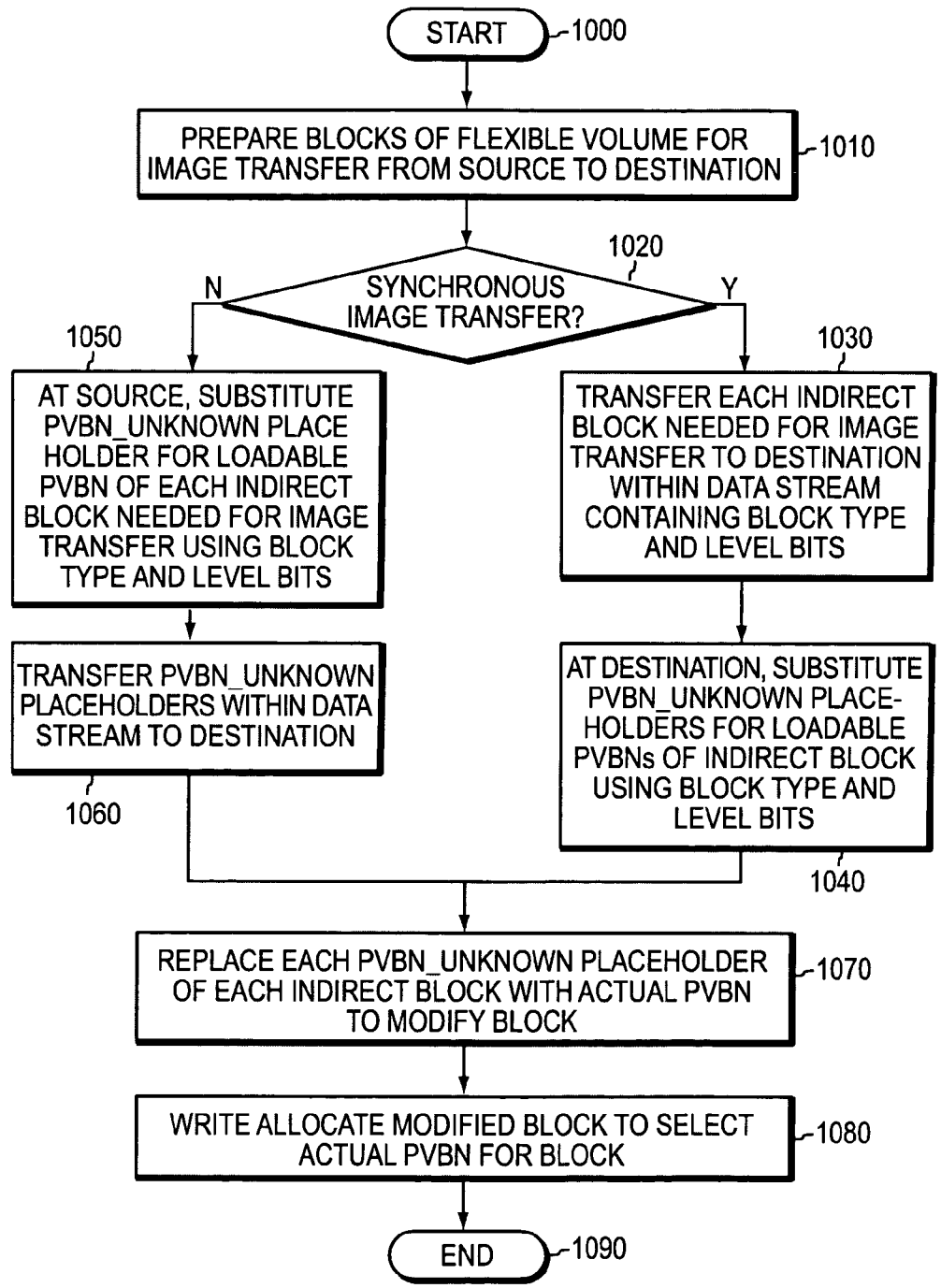
FIG. 10 is a flowchart illustrating a procedure for invalidating and replacing loadable pvbns stored in indirect blocks of a dual vbn flexible virtual volume in accordance with the present invention.

FIG. 10 is a flowchart illustrating a procedure for invalidating and replacing loadable pvbns stored in indirect blocks of a dual vbn (flexible) virtual volume in accordance with the present invention. Here, the flexible volume is transferred from a source storage system 120$_S$ to a destination storage system 120$_D$ via a synchronous or asynchronous image transfer. The procedure starts at Step 1000 and proceeds to Step 1010 where each block of the flexible volume is prepared for the image transfer. In Step 1020, a determination is made as to whether the image transfer is a synchronous image transfer. If so, each indirect block of the flexible volume needed for the image transfer is transferred from the source to the destination within a data stream containing block type and level is bits (Step 1030). At Step 1040, pvbn_unknown placeholders are substituted for any loadable pvbns of the block at the destination, using the block type and level bits.

However, if the image transfer is not synchronous, then pvbn_unknown placeholders are substituted for any loadable pvbns at the source for each indirect block of the flexible volume needed for the image transfer, using the block type and level bits (Step 1050). At Step 1060, the pvbn_unknown placeholders are transferred within a data stream from the source to the destination. Thereafter, at the destination, each pvbn_unknown placeholder of a block is replaced with an actual pvbn to thereby modify the block (Step 1070) by inserting pvbns mapped from the container map 850 into the placeholders. At Step 1080, the modified block is write allocated to select an actual pvbn for the block and the procedure ends at Step 1090.

According to the invention, the deswizzle scanner 288 may be employed to work on any dual vbn flexible volume (via image transfer or defragmentation) that has unknown pvbns. In the case of defragmentation of a flexible vvol, all pvbn pointers of blocks that have pointers to other blocks (e.g, all indirect blocks) on the volume are explicitly marked with pvbn_unknown placeholders 960. Groups of indirect blocks are then write allocated together (e.g., in the same consistency point) to enable those blocks to be allocated generally close together on disk as actual pvbns are assigned. Such "grouping" of indirect blocks enhances sequential access to the blocks.

The read path of the illustrative dual vbn flexible vvol embodiment follows the pvbn portion, e.g., 910, of the dual pvbn/vvbn pointer pair 900. That is, when a request is received at the storage system to read a particular file (or data blocks), pvbns are used to access the data blocks. This is a performance enhancement that eliminates a look up (read) operation using vvbns to the container file to obtain the mapped pvbns needed to retrieve the blocks from disk. The dual vbn buffer tree (FIG. 5) provides both pvbn and vvbn block pointers, wherein the pvbns are used to retrieve (read) and/or store (write) data/blocks from disk.

However, when encountering unknown pvbns, the vvbn portion 920 of the dual pvbn/vvbn pointer pair 900 is used to service the request. That is, in the event a data access request is received at the storage system for a block yet to undergo pvbn invalidation and replacement, the vvbn of the block is used to access the container map 850 to resolve the pvbn needed to retrieve the block from disk. As noted, a vvbn is equivalent to an fbn in the container file 800; accordingly, a vvbn may be used to resolve a pvbn of a particular block by performing a read operation on the container file for the block corresponding to the vvbn. For example, to resolve a pvbn of vvbn 35, a read operation is issued to the container file 800, requesting the offset 35 level 1 block of the container file (i.e., of the container map 850). The level 1 block for offset 35 in the container file contains a pvbn that corresponds to vvbn 35. Thus, the read path of the illustrative dual vbn flexible vvol is modified to allow access to the requested block of the volume when that block has yet to undergo pvbn invalidation and replacement. In other words, the pvbn needed to access the block is resolved in order to complete the read (or write) access.

Notably, at the time the block is retrieved from disk, its on-disk structure is not changed to the resolved pvbn; all changes to the on-disk structures of blocks are performed by the deswizzle scanner. That is, even though a dual vbn flexible vvol that has pvbn_unknown placeholders can be used to service requests using resolved pvbns, those resolved pvbns are not used to change the on-disk structure. The deswizzle scanner changes the on-disk structure of those blocks. Replacement of the pvbn_unknown on-disk structure with actual pvbns is deferred until a time when the deswizzle scanner (functioning in a background process) performs the changes. User requests for data that need to be serviced do not have to wait for the scanner; those requests can be resolved (as describe above) so that the flexible volume can continue to serve data. Note that a user request for a block that is stored in the buffer cache 170 may be served from that cache, even if its parent block has an unknown pvbn.

Advantageously, the invention may be utilized for both synchronous and asynchronous flexible vvol mirror image transfers on a same aggregate and/or between aggregates on a storage system or among different storage systems, as well as for copying and fragmentation handling of flexible vvols. By enabling a flexible vvol to serve data immediately upon pvbn invalidation, the present invention improves performance of the storage system by eliminating latencies associated with waiting for completion of actual pvbn replacement for the pvbn_unknown placeholders before rendering the system capable of serving data.

While there has been shown and described illustrative embodiments of a multi-stage technique that invalidates and replaces loadable pvbns stored in indirect blocks of a dual vbn flexible volume, it is to be understood that various other adaptations and modifications may be made within the spirit and scope of the invention. For example, in an alternate embodiment of the invention, the deswizzle scanner may be configured to move snapshotted data to less optimal places on disk, since snapshotted data is not accessed as frequently as active file system data. Accordingly, the snapshotted data may be moved to a range of pvbns that is serviced by slower disks or that is located at the outer edges of the disk (i.e., ranges of pvbns that are not optimal in performance). Here, the write allocator 282 may be configured to respond to requests that certain deswizzled blocks be moved to a particular pvbn range on disk. Essentially, the write allocation policy described herein may be modified to write allocate a collection of blocks together at a predefined pvbn range.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for invalidating and replacing a loadable block pointer stored in an indirect block of a volume served by a storage system, the method comprising:
    assembling a plurality of groups of storage devices of the storage system into an aggregate, the aggregate having a physical volume block number (pvbn) space defining a global storage space provided by the storage devices;
    storing within the aggregate a plurality of virtual volumes (vvols) of the storage system, each vvol having a file system and a virtual volume block number (vvbn) space, wherein the plurality of virtual volumes allow for two layers of virtualization;
    converting the loadable block pointer of a block pointer pair of the indirect block into a special block pointer having a predefined reserved value, the predefined reserved value providing an unknown temporary physical volume block number (pvbn_unknown) placeholder until the pvbn_unknown placeholder can be replaced by a real pvbn, wherein the block pointer pair is stored within the indirect block and includes a pvbn pointer and a vvbn pointer and the loadable block pointer is the pvbn pointer; and
    processing a request to access data by allowing the storage system to serve data from the volume using the special block pointer while an actual block pointer is computed, thereby eliminating latency associated with completion of actual block pointer replacement for the special block pointer.

2. The method of claim 1 wherein the loadable block pointer is a loadable physical volume block number (pvbn) having a value greater than zero and wherein the block pointer pair is a pvbn/virtual volume block number (vvbn) block pointer pair.

3. The method of claim 2 wherein the actual block pointer is a first actual pvbn and wherein the predefined reserved value of the special block pointer provides a pvbn_unknown placeholder until replaced by the first actual pvbn.

4. The method of claim 3 wherein the step of converting comprises:
    substituting the pvbn_unknown placeholder for the loadable pvbn using block type and level bits to determine the type of indirect block and the location of the loadable pvbn block pointer within the block; and
    replacing the pvbn_unknown placeholder with the first actual pvbn.

5. The method of claim 4 further comprising preparing the indirect block for write allocation to thereby provide a second actual pvbn for the block.

6. The method of claim 2 wherein the step of allowing comprises using a vvbn of the pvbn/vvbn block pointer pair of the indirect block to access a container map to resolve a pvbn needed to retrieve the block from disk.

7. The method of claim 3 further comprising, wherein the indirect block is a level 1 indirect block having one or more loadable pvbns that reference one or more data blocks, marking the one or more loadable pvbns of the level 1 indirect block with pvbn_unknown placeholders to thereby enable fragmentation handling of the volume.

8. A system adapted to invalidate and replace a loadable physical volume block number (pvbn) block pointer stored in an indirect block of a flexible virtual volume (vvol) of a storage system, the system comprising:
    a processor of the storage system; and
    an aggregate configured from a plurality of groups of storage devices of the storage system, the aggregate having a physical volume block number (pvbn) space defining a global storage space of blocks provided by the storage devices, the global storage space substantially simplifying storage management of free blocks through use of a single pool of storage devices;
    a plurality of virtual volumes (vvols) stored within the aggregate, each vvol containing a file system and a virtual volume block number (vvbn) space;
    a memory coupled to the processor and adapted to store a storage operating system executed by the processor, the storage operating system including one or more modules and processes configured to (i) convert the loadable pvbn of a pvbn/virtual virtual volume block number (vvbn) block pointer pair of the indirect block into a special block pointer having a predefined reserved value, the predefined reserved value providing an unknown temporary physical volume block number (pvbn_unknown) placeholder until the pvbn_unknown placeholder can be replaced by a real pvbn, wherein the block pointer pair is stored within the indirect block and includes a pvbn pointer and a vvbn pointer and the loadable block pointer is the pvbn pointer, and (ii) allow the storage system to serve data from the flexible vvol using the special block pointer while a first actual pvbn is computed, thereby eliminating latency associated with completion of actual pvbn replacement for the special block pointer.

9. The system of claim 8 wherein the predefined reserved value of the special block pointer provides a pvbn_unknown placeholder until replaced by the first actual pvbn.

10. The system of claim 9 wherein the one or more modules include a file system cooperating with one of a swizzling engine and a volume replication facility to convert the loadable pvbn into the pvbn_unknown placeholder.

11. The system of claim 10 wherein one of the swizzling engine and a process of the file system use block type and level bits to determine the type of indirect block and the location of the loadable pvbn block pointer within the block.

12. The system of claim 11 wherein the process of the file system is a message handler configured to determine where to insert the pvbn_unknown placeholder within the block.

13. The system of claim 11 wherein the indirect block is a level 1 indirect block having one or more loadable pvbns that reference one or more data blocks and wherein the process of the file system is a substitution scanner configured to mark the one or more loadable pvbns of the level 1 indirect block with the pvbn_unknown placeholders to thereby enable fragmentation handling of the flexible vvol.

14. The system of claim 10 wherein a first process of the file system is a deswizzle scanner configured to replace the pvbn_unknown placeholder with the first actual pvbn, the deswizzle scanner further configured to prepare the indirect block for write allocation.

15. The system of claim 14 wherein a second process of the file system is a write allocator configured to select a second actual pvbn for the indirect block in accordance with a write allocation policy.

16. The system of claim 15 wherein the deswizzle scanner is further configured to move snapshotted data to a less optimal place on disk.

17. The system of claim 16 wherein the less optimal place on disk is one of a range of pvbns serviced by a slow disk and located at outer edges of the disk.

18. Apparatus configured to invalidate and replace a loadable physical volume block number (pvbn) block pointer stored in an indirect block of a flexible virtual volume (vvol) of a storage system, the apparatus comprising:
means for assembling a plurality of groups of storage devices of the storage system into an aggregate, the aggregate having a physical volume block number (pvbn) space defining a global storage space provided by the storage devices;
means for storing within the aggregate into a plurality of virtual volumes (vvols) of the storage system, each vvol having a file system and a virtual volume block number (vvbn) space;
means for converting the loadable pvbn of a pvbn/virtual volume block number (vvbn) block pointer pair of the indirect block into a special block pointer having a predefined reserved value, the predefined reserved value providing an unknown temporary physical volume block number (pvbn_unknown) placeholder until the pvbn_unknown placeholder can be replaced by a real pvbn, wherein the block pointer pair is stored within the indirect block and includes a pvbn pointer and a vvbn pointer and the loadable block pointer is the pvbn pointer; and
means for allowing the storage system to serve data from the flexible vvol using the special block pointer while a first actual pvbn is computed, thereby eliminating latency associated with completion of actual pvbn replacement for the special block pointer.

19. The apparatus of claim 18 wherein the predefined reserved value of the special block pointer provides a pvbn_unknown placeholder until replaced by the first actual pvbn.

20. The apparatus of claim 19 wherein the means for converting comprises:
means for substituting the pvbn unknown placeholder for the loadable pvbn using block type and level bits to determine the type of indirect block and the location of the loadable pvbn block pointer within the block; and
means for replacing the pvbn_unknown placeholder with the first actual pvbn.

21. A computer readable storage medium containing executable program instructions for invalidating and replacing a loadable physical volume block number (pvbn) block pointer stored in an indirect block of a flexible virtual volume (vvol) of a storage system, the executable instructions comprising one or more program instructions for:
assembling a plurality of groups of storage devices of the storage system into an aggregate, the aggregate having a physical volume block number (pvbn) space defining a global storage space provided by the storage devices;
storing within the aggregate a plurality of virtual volumes (vvols) of the storage system, each vvol having a file system and a virtual volume block number (vvbn) space;
converting the loadable pvbn of a pvbn/virtual volume block number (vvbn) block pointer pair of the indirect block into a special block pointer having a predefined reserved value, the predefined reserved value providing an unknown temporary physical volume block number (pvbn_unknown) placeholder until the pvbn_unknown placeholder can be replaced by a real pvbn, wherein the block pointer pair is stored within the indirect block and includes a pvbn pointer and a vvbn pointer and the loadable block pointer is the pvbn pointer; and
allowing the storage system to serve data from the flexible vvol using the special block pointer while a first actual pvbn is computed, thereby eliminating latency associated with completion of actual pvbn replacement for the special block pointer.

22. The computer readable storage medium of claim 21 wherein the predefined reserved value of the special block pointer provides a pvbn_unknown placeholder until replaced by the first actual pvbn.

23. The computer readable storage medium of claim 22 wherein the one or more program instructions for converting comprises one or more program instructions for:
substituting the pvbn_unknown placeholder for the loadable pvbn using block type and level bits to determine the type of indirect block and the location of the loadable pvbn block pointer within the block; and
replacing the pvbn_unknown placeholder with the first actual pvbn.

24. A method for invalidating and replacing a loadable block pointer stored in an indirect block of a volume served by a storage system, the method comprising:
assembling one or more groups of storage devices of the storage system into an aggregate, the aggregate having a physical volume block number (pvbn) space defining a global storage space provided by the storage devices;
storing within the aggregate into a plurality of virtual volumes (vvols) of the storage system, each vvol having a file system and a virtual volume block number (vvbn) space;
converting, by a swizzling engine and a deswizzle scanner executing on a storage operating system of the storage system, the loadable block pointer of a block pointer pair of the indirect block into a special block pointer having a predefined reserved value, the predefined reserved value providing an unknown temporary physical volume block number (pvbn_unknown) placeholder until the pvbn_unknown placeholder can be replaced by a real pvbn, wherein the block pointer pair is stored within the indirect block and includes a pvbn pointer and a vvbn pointer and the loadable block pointer is the pvbn pointer; and allowing the storage system to serve data from the volume using the special block pointer while an actual block pointer is computed, thereby eliminating latency associated with completion of actual block pointer replacement for the special block pointer.

25. The method of claim 24 wherein the step of converting comprises using a block type and a plurality of level bits to determine a type of processing needed for a particular block to substitute the special block pointer for the loadable block pointer.

26. The method of claim 24 wherein the block pointer pair comprises a pvbn/vvbn pair.

27. The method of claim 26 wherein the step of converting further comprises accessing, by the deswizzle scanner, an appropriate indirect block of a container file to map a vvbn of the pvbn/vvbn pair to its corresponding pvbn, and replacing a special block pointer having a predefined reserved value of the block with an actual pvbn.

28. The method of claim 27 wherein the step of replacing further comprises starting from a bottom of a inode tree of a plurality regular files and proceeding up the trees of those said files to a inode file before eventually reaching a fsinfo block, the fsinfo block containing a block pointer to an inode file that contains inodes of a plurality of files.

29. The method of claim 27 wherein the step of replacing further comprises starting at a stage of a buffer tree of a particular indirect block which does not have a special block pointer and moving down the buffer tree.

30. A system adapted to invalidate and replace a loadable physical volume block number (pvbn) block pointer stored in an indirect block of a flexible virtual volume (vvol) of a storage system, the system comprising:
a processor of the storage system; and
an aggregate configured from one or more groups of storage devices of the storage system, the aggregate having a physical volume block number (pvbn) space defining a global storage space of blocks provided by the storage devices, the global storage space substantially simplifying storage management of free blocks through use of a single pool of storage devices;
a plurality of virtual volumes (vvols) stored within the aggregate, each vvol containing a file system and a virtual volume block number (vvbn) space;
a memory coupled to the processor and adapted to store a storage operating system executed by the processor, the storage operating system including a swizzling engine and a deswizzle scanner and processes configured to (i) convert the loadable pvbn of a pvbn/virtual volume block number (vvbn) block pointer pair of the indirect block into a special block pointer having a predefined reserved value, the predefined reserved value providing an unknown temporary physical volume block number (pvbn_unknown) placeholder until the pvbn_unknown placeholder can be replaced by a real pvbn, wherein the block pointer pair is stored within the indirect block and includes a pvbn pointer and a vvbn pointer and the loadable block pointer is the pvbn pointer, and (ii) allow the storage system to serve data from the flexible vvol using the special block pointer while a first actual pvbn is computed, thereby eliminating latency associated with completion of actual pvbn replacement for the special block pointer.

31. The system of claim 30 wherein the process configured to convert requires accessing an appropriate indirect block of a container file to map a vvbn of the pvbn/vvbn pair to its corresponding pvbn with the deswizzle scanner, and replacing a special block pointer with an actual pvbn.

32. The system of claim 30 wherein the deswizzle scanner starts from a bottom of a inode tree of a plurality of regular files and proceeds up the trees of those said files to the inode file before eventually reaching a fsinfo block, the fsinfo block containing a block pointer to an inode file that contains inodes of a plurality of files.

33. An apparatus configured to invalidate and replace a loadable physical volume block number (pvbn) block pointer stored in an indirect block of a flexible virtual volume (vvol) of a storage system, the apparatus comprising:
means for assembling one or more groups of storage devices of the storage system into an aggregate, the aggregate having a physical volume block number (pvbn) space defining a global storage space provided by the storage devices;
means for storing within the aggregate a plurality of virtual volumes (vvols) of the storage system, each vvol having a file system and a virtual volume block number (vvbn) space;
means for converting the loadable pvbn of a pvbn/virtual volume block number (vvbn) block pointer pair of the indirect block into a special block pointer having a predefined reserved value, the predefined reserved value providing an unknown temporary physical volume block number (pvbn_unknown) placeholder until the pvbn_unknown placeholder can be replaced by a real pvbn, wherein the block pointer pair is stored within the indirect block and includes a pvbn pointer and a vvbn pointer and the loadable block pointer is the pvbn pointer;
a storage system configured to serve data from the flexible vvol using the special block pointer while a first actual pvbn is computed, thereby eliminating latency associated with completion of actual pvbn replacement for the special block pointer;
a swizzling engine configured to substitute the special block pointer for the loadable pvbns; and
a deswizzle scanner configured to replace the special block pointer with the first actual pvbn.

34. The apparatus of claim 33 wherein the swizzling engine is further configured to use a block type and a plurality of level bits to determine a type of processing needed for a particular block to substitute the special block pointer for the loadable pvbns.

35. The apparatus of claim 33 wherein the deswizzle scanner is further configured to (i) access an appropriate indirect block of a container file to map a vvbn of the pvbn/vvbn pair to its corresponding pvbn, (ii) replace the special block pointer with an actual pvbn, (iii) insert a new pvbn value for the special block pointer by starting from a bottom of a inode tree of a plurality regular files and proceeding up the trees of those said files to the inode file before eventually reaching a fsinfo block, the fsinfo block containing a block pointer to an inode file that contains inodes of a plurality of files.

36. A method for invalidating and replacing a loadable block pointer stored in an indirect block of a volume served by a storage system, the method comprising:
assembling one or more groups of storage devices of the storage system into an aggregate, the aggregate having a physical volume block number (pvbn) space defining a global storage space provided by the storage devices;

storing within the aggregate a plurality of virtual volumes (vvols) of the storage system, each vvol having a file system and a virtual volume block number (vvbn) space;

converting the loadable block pointer of a block pointer pair of the indirect block into a special block pointer having a predefined reserved value, the predefined reserved value providing a temporary physical volume block number_unknown (pvbn_unknown) placeholder until the pvbn_unknown placeholder can be replaced by a real pvbn, wherein the block pointer pair is stored within the indirect block and includes a pvbn pointer and a vvbn pointer and the loadable block pointer is the pvbn pointer;

substituting the loadable block pointer of the block pointer pair with the pvbn_unknown using a plurality of block type bits and a plurality of level bits to determine a type of each block and a location of at least one block pointer with the type of each block retrieved from a disk; and allowing the storage system to serve data from the volume using the special block pointer while an actual block pointer is computed, thereby eliminating latency associated with completion of actual block pointer replacement for the special block pointer.

37. The method of claim 36 wherein the loadable block pointer is a loadable physical volume block number (pvbn) having a value greater than zero and wherein the block pointer pair is a pvbn/virtual volume block number (vvbn) block pointer pair.

38. The method of claim 37 wherein the actual block pointer is a first actual pvbn and wherein the predefined reserved value of the special block pointer provides a pvbn_unknown placeholder until replaced by the first actual pvbn.

39. The method of claim 38 further comprising, wherein the indirect block is a level 1 indirect block having one or more loadable pvbns that reference one or more data blocks, marking the one or more loadable pvbns of the level 1 indirect block with pvbn_unknown placeholders to thereby enable fragmentation handling of the volume.

40. The method of claim 36 further comprising preparing the indirect block for write allocation to thereby provide a second actual pvbn for the block.

41. The method of claim 37 wherein allowing comprises using a vvbn of the pvbn/vvbn block pointer pair of the indirect block to access a container map to resolve a pvbn needed to retrieve the block from disk.

42. A computer readable storage medium containing executable program instructions for invalidating and replacing a loadable physical volume block number (pvbn) block pointer stored in an indirect block of a flexible virtual volume (vvol) of a storage system, the executable instructions comprising one or more program instructions for:

assembling one or more groups of storage devices of the storage system into an aggregate, the aggregate having a physical volume block number (pvbn) space defining a global storage space provided by the storage devices;

storing with the aggregate a plurality of virtual volumes (vvols) of the storage system, each vvol having a file system and a virtual volume block number (vvbn) space;

converting the loadable block pointer of a block pointer pair of the indirect block into a special block pointer having a predefined reserved value, the predefined reserved value providing a temporary physical volume block number_unknown (pvbn_unknown) placeholder until the pvbn_unknown placeholder can be replaced by a real pvbn, wherein the block pointer pair is stored within the indirect block and includes a pvbn pointer and a vvbn pointer and the loadable block pointer is the pvbn pointer;

substituting the loadable block pointer of the block pointer pair with the pvbn_unknown using a plurality of block type bits and a plurality of level bits to determine a type of each block and a location of at least one block pointer with the type of each block retrieved from a disk; and allowing the storage system to serve data from the volume using the special block pointer while an actual block pointer is computed, thereby eliminating latency associated with completion of actual block pointer replacement for the special block pointer.

43. A system adapted to invalidate and replace a loadable physical volume block number (pvbn) block pointer stored in an indirect block of a flexible virtual volume (vvol) of a storage system, the system comprising:

a processor of the storage system; and an aggregate configured from one or more groups of storage devices of the storage system, the aggregate having a physical volume block number (pvbn) space defining a global storage space of blocks provided by the storage devices, the global storage space substantially simplifying storage management of free blocks through use of a single pool of storage devices;

a plurality of virtual volumes (vvols) stored within the aggregate, each vvol containing a file system and a virtual volume block number (vvbn) space;

a memory coupled to the processor and adapted to store a storage operating system executed by the processor, the storage operating system including one or more modules and processes configured to (i) convert the loadable pvbn of a pvbn/virtual virtual volume block number (vvbn) block pointer pair of the indirect block into a special block pointer having a predefined reserved value, the predefined reserved value providing a temporary physical volume block number_unknown (pvbn_unknown) placeholder until the pvbn_unknown placeholder can be replaced by a real pvbn, wherein the block pointer pair is stored within the indirect block and includes a pvbn pointer and a vvbn pointer and the loadable block pointer is the pvbn pointer, (ii) substitute the loadable block pointer of the block pointer pair with the pvbn_unknown using a plurality of block type bits and a plurality of level bits to determine a type of each block and a location of at least one block pointer with the type of each block retrieved from a disk, and (iii) allow the storage system to serve data from the flexible vvol using the special block pointer while a first actual pvbn is computed, thereby eliminating latency associated with completion of actual pvbn replacement for the special block pointer.

44. The system of claim 43 wherein the one or more modules include a file system cooperating with one of a swizzling engine and a volume replication facility to convert the loadable pvbn into the pvbn_unknown placeholder.

45. The system of claim 44 wherein one of the swizzling engine and a process of the file system use block type and level bits to determine the type of indirect block and the location of the loadable pvbn block pointer within the block.

46. The system of claim 45 wherein the process of the file system is a message handler configured to determine where to insert the pvbn_unknown placeholder within the block.

47. The system of claim 45 wherein the indirect block is a level 1 indirect block having one or more loadable pvbns that reference one or more data blocks and wherein the process of the file system is a substitution scanner configured to mark the one or more loadable pvbns of the level 1 indirect block with the pvbn_unknown placeholders to thereby enable fragmentation handling of the flexible vvol.

48. The system of claim 44 wherein a first process of the file system is a deswizzle scanner configured to replace the pvbn_unknown placeholder with the first actual pvbn, the deswizzle scanner further configured to prepare the indirect block for write allocation.

49. The system of claim 48 wherein a second process of the file system is a write allocator configured to select a second actual pvbn for the indirect block in accordance with a write allocation policy.

50. The system of claim 49 wherein the deswizzle scanner is further configured to move snapshotted data to a less optimal place on disk.

51. The system of claim 50 wherein the less optimal place on disk is one of a range of pvbns serviced by a slow disk and located at outer edges of the disk.

52. A method, comprising:

configuring a plurality of groups of storage devices of a storage system into an aggregate, the aggregate having a physical volume block number (pvbn) space defining a global storage space provided by the storage devices;

storing within the aggregate a plurality of virtual volumes (vvols) of the storage system, each vvol having a file system and a virtual volume block number (vvbn) space, wherein the plurality of virtual volumes allow for two layers of virtualization;

converting the loadable block pointer of a block pointer pair of an indirect block into a special block pointer having a predefined reserved value, the predefined reserved value providing an unknown temporary physical volume block number (pvbn_unknown) placeholder until the pvbn_unknown placeholder can be replaced by a real pvbn, wherein the block pointer pair is stored within the indirect block and includes a pvbn pointer and a vvbn pointer and the loadable block pointer is the pvbn pointer; and processing a request to access a block yet to undergo pvbn invalidation and replacement using the vvbn pointer from the indirect block to access a container map to resolve the pvbn pointer needed to retrieve the block from a storage device.

* * * * *

UNITED STATES PATENT AND TRADEMARK OFFICE
CERTIFICATE OF CORRECTION

PATENT NO.        : 7,730,277 B1
APPLICATION NO.   : 10/972817
DATED             : June 1, 2010
INVENTOR(S)       : Ashish Prakash et al.

It is certified that error appears in the above-identified patent and that said Letters Patent is hereby corrected as shown below:

Col. 3, Line 56, should read the destination. The[[ is]] image transfer may be performed in Col. 4, Line 31, should read In addition, the[[ is]] deswizzle scanner prepares the blocks Col. 7, Line 44, should read interface (UI)[[ is]] 275, in response to a user (system adminis- Col. 11, Line 65, should read ume of a conventional storage system, a[[ wol]] vvol is analogous to a Col. 12, Line 1, should read

[[wol]]vvol 610 and wherein the sum of the storage space consumed

Col. 12, Line 2, should read by the[[ wols]] vvols is physically smaller than (or equal to) the size of Col. 12, Line 6, should read ded[[ wol]] vvol (within a file) utilizes a "logical" vvbn space to Col. 12, Line 10, should read disks. Since the[[ wol] vvol 610 is also a logical volume, it has its own Signed and Sealed this Thirteenth Day of July, 2010

David J. Kappos
*Director of the United States Patent and Trademark Office*

Col. 12, Line 52, should read directory 770 and subdirectories of[[ is]] files that can be Col. 13, Line 26, should read an fbn 2000 and an[[ is]] indirect (level 1) block 804 has a block Col. 13, Line 49, should read dling of the flexible[[ wol]] vvol. As defined herein, a loadable pvbn is Col. 13, Line 56, should read serve data from the flexible[[ wol]] vvol using the placeholders while Col. 17, Line 51, should read tion within a data stream containing block type and level[[ is]]